(12) United States Patent
Sato

(10) Patent No.: US 8,427,674 B2
(45) Date of Patent: Apr. 23, 2013

(54) INFORMATION PROCESSING APPARATUS WITH TEMPLATE CONTROL OF PROCESS FLOW IN A PRINT DEVICE

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 12/345,585

(22) Filed: Dec. 29, 2008

(65) Prior Publication Data

US 2009/0174897 A1    Jul. 9, 2009

(30) Foreign Application Priority Data

Jan. 8, 2008  (JP) ................. 2008-001646

(51) Int. Cl.
*G06F 3/12*    (2006.01)
(52) U.S. Cl.
USPC .......................................... 358/1.15; 358/1.9
(58) Field of Classification Search .................. None
See application file for complete search history.

(56) References Cited

U.S. PATENT DOCUMENTS

| | | | |
|---|---|---|---|
| 7,120,910 B2 | 10/2006 | Matsuda et al. | |
| 7,418,632 B2 * | 8/2008 | Iida | 714/39 |
| 2003/0214657 A1 * | 11/2003 | Stringham | 358/1.1 |
| 2004/0080546 A1 * | 4/2004 | Fritz | 345/826 |
| 2006/0271936 A1 * | 11/2006 | Matsuda et al. | 718/102 |

FOREIGN PATENT DOCUMENTS

| | | |
|---|---|---|
| JP | 2004-135003 A | 4/2004 |
| JP | 2004-259250 A | 9/2004 |
| JP | 2006-270632 A | 10/2006 |

OTHER PUBLICATIONS

Japanese Office Action dated Nov. 16, 2012 issued in corresponding Japanese Patent Application No. 2008-001646.

* cited by examiner

*Primary Examiner* — Twyler Haskins
*Assistant Examiner* — Christopher D Wait
(74) *Attorney, Agent, or Firm* — Fitzpatrick, Cella, Harper & Scinto

(57) ABSTRACT

An information processing apparatus that reflects edited content in a process flow when the process flow has been created based on a template and the template forming the basis of the process flow has been edited. To accomplish this, the information processing apparatus, which executes processes in accordance with process flows, creates a process flow that describes the process content of tasks, based on a process flow template. At this time, the information processing apparatus edits the template used by the process flow when editing of the template is instructed, and changes a portion corresponding to the template of the created process flow into the changed content of the edited template.

12 Claims, 15 Drawing Sheets

FIG. 5

| 501 | 502 | 503 | 504 | 505 | 506 |
|---|---|---|---|---|---|
| ID | PROCESS FLOW NAME | ACCESS | TEMPLATE ID | TEMPLATE UPDATED ON | PROCESS FLOW DEFINITION |
| 1 | COMBINE & SEND CONTRACTUAL DOCUMENT | User A | 101 | 200X/... | ... |
| 2 | DISTRIBUTE MINUTES | User A | | | |
| 3 | PRINT FILE | User B | 102 | 200X/... | ... |
| 4 | BUSINESS TRIP APPLICATION | SHARED | | | |
| ... | | | | | |

FIG. 6

```
PROCESS FLOW DEFINITION FILE : 600
<?xml version="1.0" encoding="utf-8"?>
<Taskflow id="1" caption="COMBINE & SEND CONTRACTUAL DOCUMENT"Extends="101"
          TemplateName="SEND CONTRACTUAL DOCUMENT" "TemplateDate="20XX..."> ⎫
  <Task type="Scan">                    ～601                                  ⎪
    <Setting>......</Setting>                                                  ⎪
  </Task>                                                                      ⎪
  <Task type="Box">                     ～602                                  ⎪
    <Doc id="doc101">                   ～603                                  ⎪
    <Setting>......</Setting>                                                  ⎪
  </Task>                                                                      ⎬ 650
  <Task type="Combine">                 ～604                                  ⎪
    <Doc id="doc101">                                                          ⎪
    <Doc id="scan001">                                                         ⎪
  </Task>                                                                      ⎪
  <Task type="Send">                    ～605                                  ⎪
    <Setting type="Addr">               ～606                                  ⎪
      Customer@......                                                          ⎪
    </Setting>                                                                 ⎪
    <Setting>......</Setting>                                                  ⎪
  </Task>                                                                      ⎪
  <Task type="Print">                   ～607                                  ⎪
    <Setting>......</Setting>                                                  ⎪
  </Task>                                                                      ⎪
</Taskflow>                                                                    ⎭
```

FIG. 7

Taskflow Tag : 650
<Taskflow id="1" caption="COMBINE & SEND CONTRACTUAL DOCUMENT" Extends="101"
TemplateName="SEND CONTRACTUAL DOCUMENT" "TemplateDate="20XX...">

651 — id="1"
652 — caption
653 — Extends
654 — TemplateName
655 — TemplateDate

FIG. 8

| ID (801) | TEMPLATE NAME (802) | TEMPLATE UPDATED ON (803) | TEMPLATE CREATED ON (804) | TEMPLATE DEFINITION (805) |
|---|---|---|---|---|
| 101 | SEND CONTRACTUAL DOCUMENT | 200XX/... | 200XX/... | ... |
| 102 | PRINT | 200XX/... | 200XX/... | ... |
| : | | | | |

FIG. 9

```
TEMPLATE DEFINITION FILE : 900
<?xml version="1.0" encoding="utf-8"?>
<Templateflow id="1" caption="SEND CONTRACTUAL DOCUMENT"    ⎫
 date="20XX..." "lastUpdate="20XX..."">                      ⎬ 901
<TempTask type="Scan" execute="True">  ~902                  ⎭
   <Setting>......</Setting>      ⎫
</TempTask>                        ⎬ 903
<TempTask type="Box" execute="True">⎭
   <Doc id="doc101"/>
   <Setting>......</Setting>
</TempTask>
<TempTask type="Send" execute="True">
   <Setting type="Addr">
      Customer@...
   </Setting>
   <Setting>......</Setting>
</TempTask>
<TempTask type="Print" execute="True">
   <Setting>......</Setting>
</TempTask>
<TempTask type="Save" execute="False"/>
</Templateflow>
```

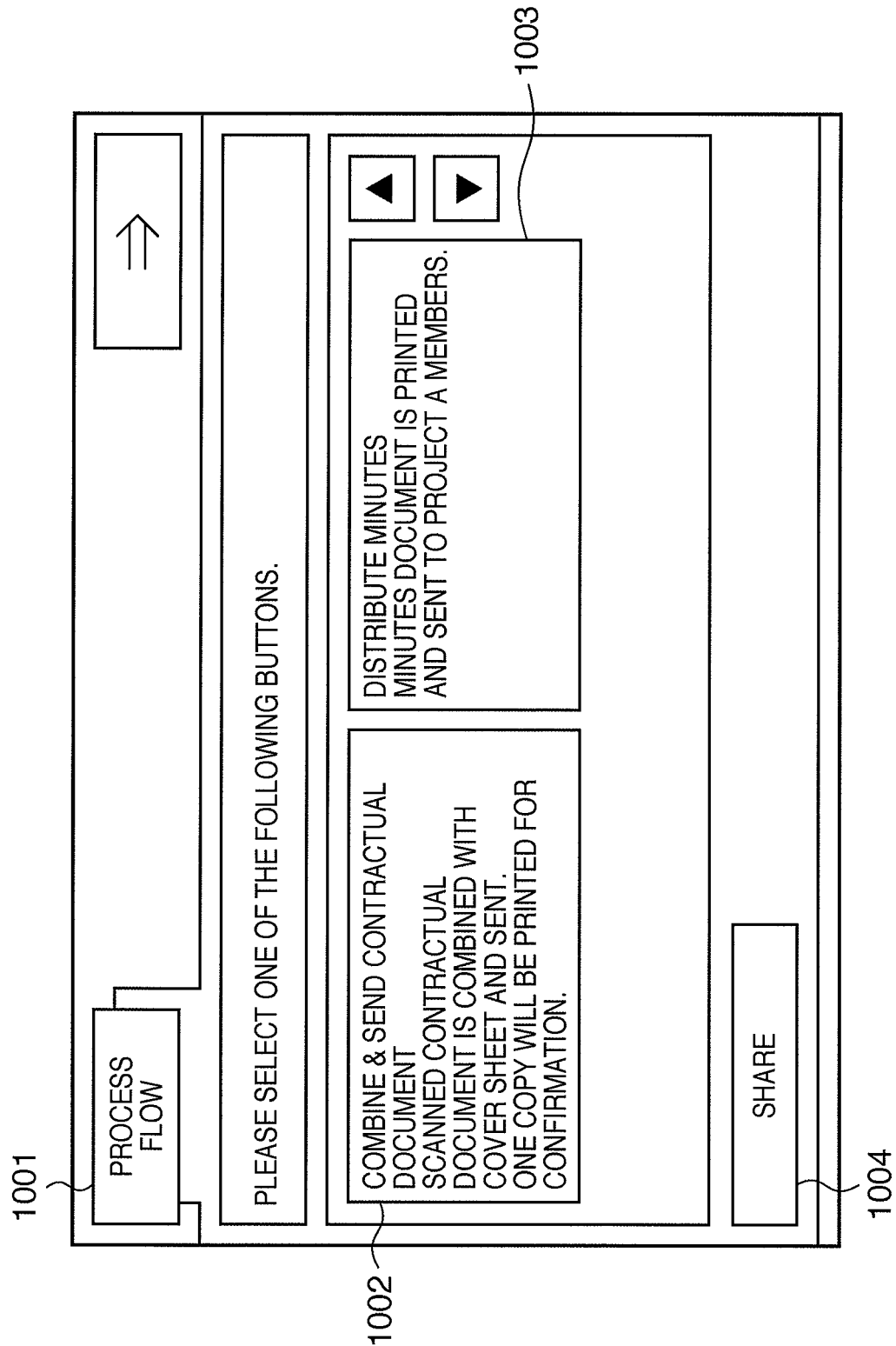

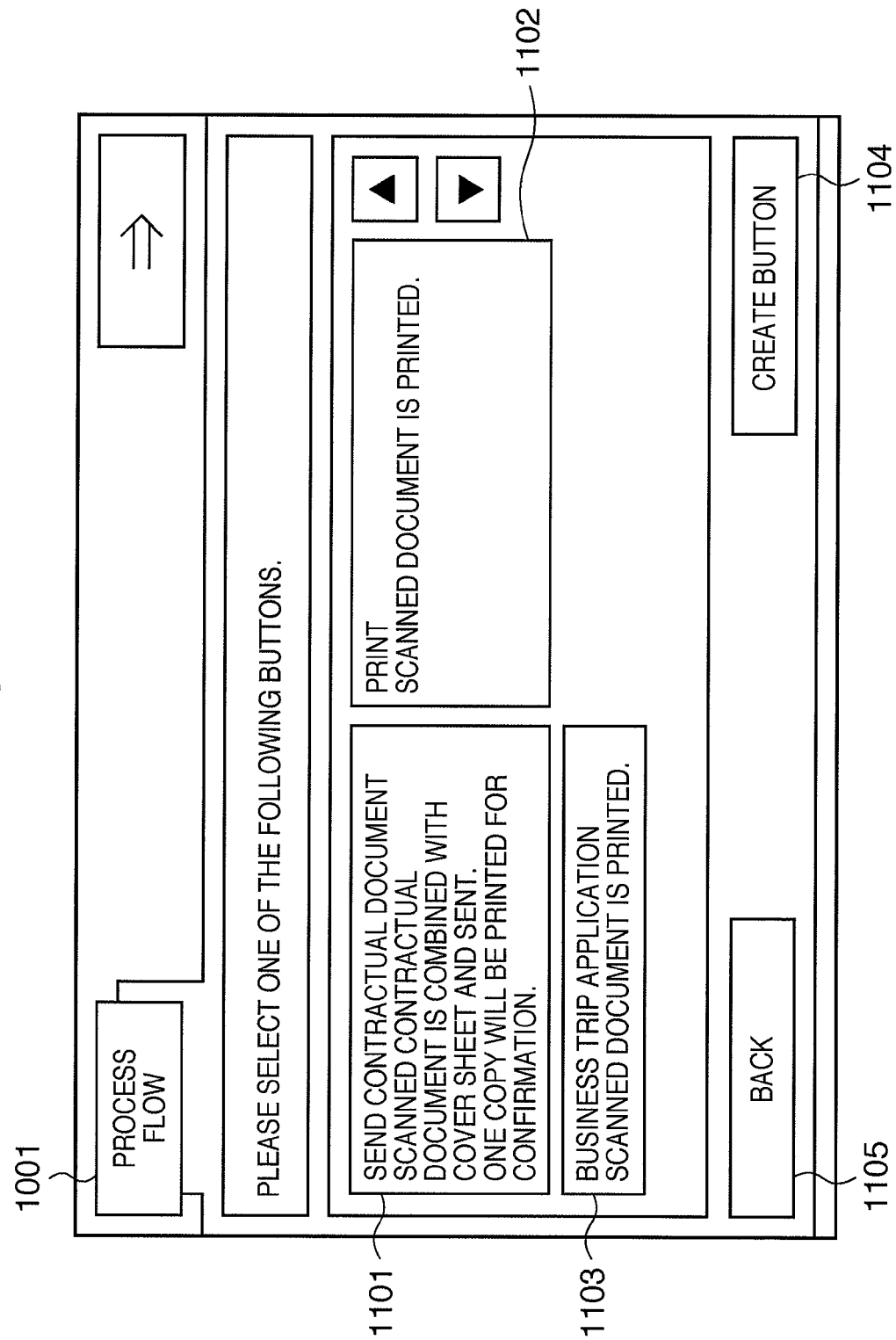

INFORMATION PROCESSING APPARATUS WITH TEMPLATE CONTROL OF PROCESS FLOW IN A PRINT DEVICE

BACKGROUND OF THE INVENTION

1. Field of the Invention

The present invention relates to an information processing apparatus that executes a plurality of tasks as a continuous process flow, and to a control method thereof.

2. Description of the Related Art

A task denotes, for example, a process that can be realized with the individual functions of an image forming apparatus or the like provided with multiple functions, or a process that can be realized by an executable application. Input and output tasks provided in the above image forming apparatus include scanning originals, printing document data, transmission (emails, faxes, files, etc.), and saving to disk (i.e., to a hard disk internally or externally to the image forming apparatus). Editing tasks include combining multiple pieces of document data, deleting pages within document data, and the like.

A combination of tasks that is created with the aim of linking together the above plurality of tasks to be processed in time-series is called a process flow. Combining tasks in this way enables various combined processing to be performed, including inputting a result obtained with one task and starting another task according to the input processing result.

As such, there are image forming apparatuses that can display these process flows as a user interface (UI). With such image forming apparatuses, a process flow is executed according to a button operation on the UI by a user. This UI is provided with a mode in which general users are able to create process flows, and a mode (administrator mode) in which general users are not able to create process flows. Administrator mode is set in the case where the administrator wants to allow general users to use a process flow that he or she has designed, with the administrator creating an entire process flow for general users to use and distributing the process flow to users.

On the other hand, it is often the case that part of a process flow is designed by the administrator, with general users being allowed to edit the remainder. For example, assume that the administrator wants to send the same image data as was printed to the document management server, and has created a corresponding process flow. In this case, the same image data as the printed image data need only be transmitted to the document management server, so it is permissible to combine a plurality of documents beforehand, or to delete unnecessary pages from the document data. However, when administrator mode has been set, general users are not permitted to edit the process flow. If a general user wants to combine a plurality of documents, or delete pages from the document data, he or she must ask the administrator to edit the process flow. Dealing with all such requests places a burden on the administrator, and also creates hassles for general users.

In response, Japanese Patent Application Laid-Open No. 2006-270632 proposes a technique for defining user information in the process flow data, and storing the user information in the image processing apparatus in association with executability information on each task. With this technique, when execution of a process flow is instructed, a user defined in the process flow executes only permitted tasks. Further, the user is able to change the parameters (number of copies, double-sided printing, etc.) of permitted tasks.

However, with the above conventional technique, the user, when executing a task, is only able to change the parameters of that task, and cannot add a new task. Also, the user, being unable to create a new process flow, is required to change the parameters every time the task is executed.

SUMMARY OF THE INVENTION

The present invention enables realization of an information processing apparatus that reflects edited content in a process flow when the process flow has been created based on a template and the template forming the basis of the process flow has been edited, and a control method thereof.

One aspect of the present invention provides an information processing apparatus comprising: a creation unit configured to create a process flow that describes process content of a task, based on a process flow template; an execution unit configured to execute a process in accordance with content of the process flow created by the creation unit; an editing unit configured to edit the template; and a changing unit configured to change a portion corresponding to the template of the process flow created by the creation unit into changed content of the template edited by the editing unit.

Another aspect of the present invention provides a control method of an information processing apparatus, comprising the steps of: creating a process flow that describes process content of a task, based on a process flow template; executing a process in accordance with content of the process flow created in the creation step; editing the template; and changing a portion corresponding to the template of the process flow created by the creation unit into changed content of the template edited in the editing step.

Still another aspect of the present invention provides an information processing apparatus that performs a process in accordance with a process flow, comprising: a storage unit configured to store one or more process flows, each of which is defined by definition information; a display unit configured to display a process flow permitted to be accessed by a specific user, out of the one or more process flows stored in the storage unit; a presentation unit configured to specify the process flow displayed by the display unit, and present to the user a template used by the specified process flow; a unit configured to identifiably display whether a function of each task included in the template presented by the presentation unit is editable; an editing unit configured to edit an editable function of a task, out of the functions of the one or more tasks included in the template; and a changing unit configured to change a portion corresponding to the template of the process flow created by the creation unit into changed content of the template edited by the editing unit.

Further features of the present invention will be apparent from the following description of exemplary embodiments with reference to the attached drawings.

BRIEF DESCRIPTION OF THE DRAWINGS

FIG. 5 schematically represents a process flow management file managed by the MFP according to a first embodiment of the present invention.

FIG. 6 shows an exemplary process flow definition file used by the MFP according to a first embodiment of the present invention.

FIG. 7 illustrates a tag 650 shown in FIG. 6.

FIG. 8 schematically represents a process flow template management file managed by the MFP according to embodiment 1.

FIG. 9 shows an exemplary process flow template definition file according to first embodiment.

FIG. 10 shows an exemplary operation screen displayed on an operation unit when a user A has logged in.

FIG. 11 shows an exemplary "shared screen" displaying process flow templates and a process flow with respect to which access is shared, when a button in FIG. 10 has been pressed.

DESCRIPTION OF THE EMBODIMENTS

Preferred embodiments of the present invention will be described in detail with reference to the drawings. It should be noted that the relative arrangement of the components and the numerical expressions and numerical values set forth in these embodiments do not limit the scope of the present invention unless it is specifically stated otherwise.

Embodiment 1

Figure 1:
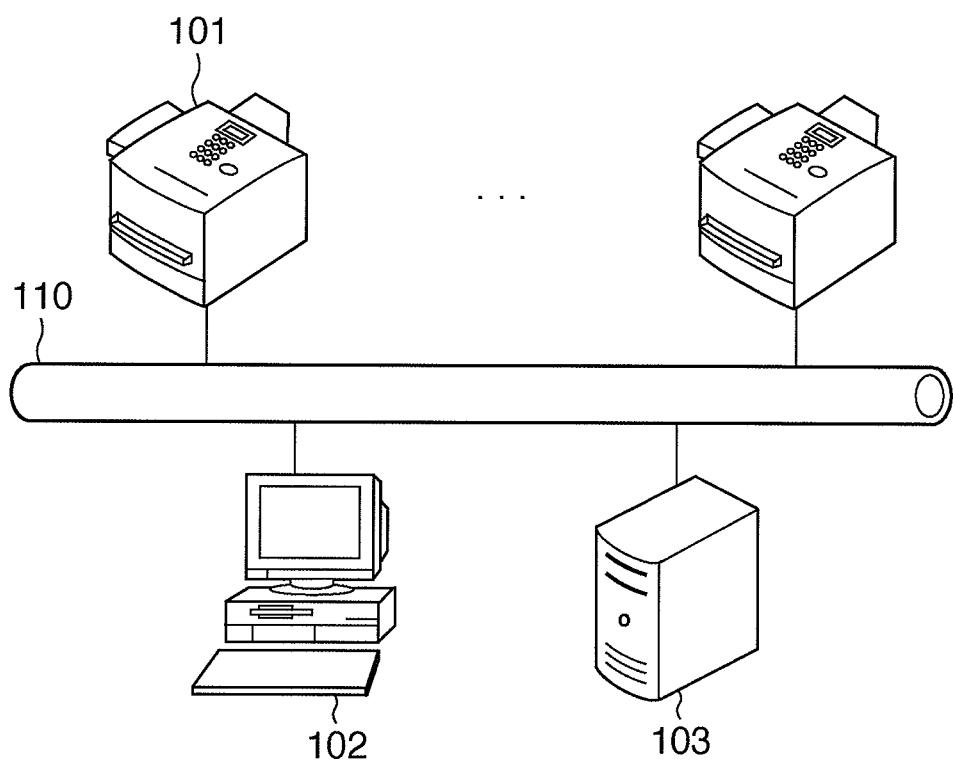
FIG. 1 shows an exemplary image forming system that applies an image forming apparatus (MFP) according to preferred embodiments of the present invention.

FIG. 1 shows an exemplary image forming system that applies an image forming apparatus (MFP) according to preferred embodiments of the present invention. Note that while being described in the present embodiment using an image forming apparatus as an example, the present invention is not limited to an image forming apparatus and may be applied to an information processing device such a communication apparatus or a personal computer (PC). That is, the present invention is applicable to an information processing apparatus that includes such image forming apparatuses and information processing devices.

An MFP (multifunction peripheral) 101, a client PC 102 and a server 103 are connected via a LAN 110. The MFP 101 is a multifunction processing apparatus that includes a fax function, a copy function, a printer function, a storage function, a scanner function, and the like. An administrator, using the client PC 102, is able to edit process flows (detailed below) that describe process content derived from a combination of these functions, and templates of these process flows (detailed below). The server 103 manages the process flows and templates. A plurality of MFPs configured similarly to the MFP 101 are connected via the LAN 110. Process flows can also be created and edited in the MFP 101, and process flows can also be analyzed and their various functions may be executed. Note that while the client PC 102 which creates process flows and templates and the server 103 which manages these process flows and templates have separate configurations in the present embodiment, process flows and templates may be created and managed in the same PC.

Figure 2:
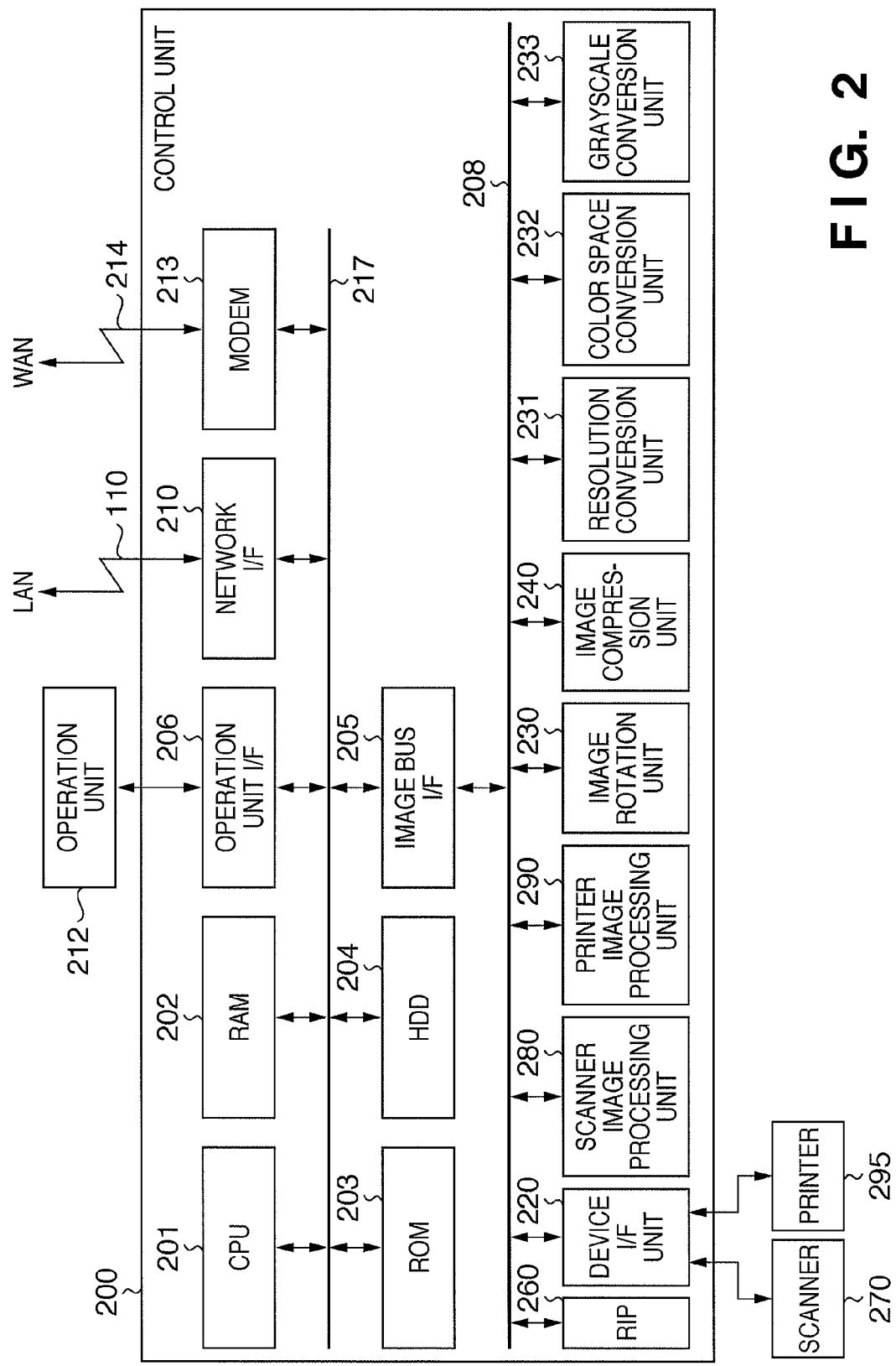
FIG. 2 is a block diagram for illustrating a configuration of the MFP according to the preferred embodiments.

FIG. 2 is a block diagram for illustrating the internal configuration of the MFP 101 according to the present embodiment.

A control unit 200 is connected to a scanner 270 that serves as an image input device and a printer unit 295 that serves as an image output device. Input and output of image information and device information is performed via a connection to the LAN 110 or a public line (WAN) 214. A CPU 201 controls the operations of the entire MFP 101. A RAM 202 provides a work memory that stores various data as a work area and also an image memory for temporarily storing image data, as well as storing programs to be executed by the CPU 201. A ROM 203 is a boot ROM that stores boot programs for the MFP 101. An HDD 204 is a hard disk drive that stores image data, software modules that are loaded in the RAM 202 when executing programs, and the like. An operation unit I/F 206 controls an interface with an operation unit (UI) 212, outputting image data to be displayed on the operation unit 212 to the operation unit 212, and inputting information on button operations performed by the user using the operation unit 212. A network I/F 210 is connected to the LAN 110, and inputs and outputs data from and to the LAN 110. A modem 213 is connected to the public line 214, and inputs and outputs image information and the like. The above components are disposed on a system bus 207.

An image bus I/F 205 is a bus bridge that connects the system bus 207 and an image bus 208 that transmits image data at high speed, and converts data structures. The image bus 208 is constituted by a PCI bus or IEEE 1394. The following devices are disposed on this image bus 208.

A raster image processor (RIP) 260 develops page description language (PDL) code into a bitmap image. A device I/F unit 220 connects the scanner 270, the printer unit 295 and the control unit 200, and performs synchronous and asynchronous conversion of image data. A scanner image processing unit 280 corrects, processes, and edits input image data. The scanner image processing unit 280 also has a function of determining whether an input image is color or monochrome from the chroma signal of the image, and holding the result. A printer image processing unit 290 corrects, processes, and edits output image data. An image rotation unit 230 rotates an image at the same time as the image is read from the scanner 270 and stores the rotated image in the RAM 202, in coordination with the scanner image processing. The image rotation unit 230 also rotates image data in the RAM 202 and stores the rotated data in the RAM 202. Alternatively, the image rotation unit 230 is able to rotate image data in the RAM 202 and print the rotated data in coordination with the printer image processing unit 290. A resolution conversion unit 231 converts the resolution of image data in the RAM 202 and stores the converted image data in the RAM 202. A color space conversion unit 232 converts a YUV image in the RAM 202 to a Lab image using a matrix operation, and stores the converted image in the RAM 202. A grayscale conversion unit 233, for example, converts an 8-bit (256 grayscale levels) image in the RAM 202 to 1-bit (2 grayscale levels) data using a method such as an error diffusion process, and stores the converted data in the RAM 202. An image compression unit 240 performs compression and decompression using JPEG for multi-value image data and JBIG, MMR, MR, MH or the like for binary image data. The image rotation unit 230, the resolution conversion unit 231, the color space conversion unit 232, the grayscale conversion unit 233, and the image compression unit 240 can operate in conjunction with one another. And in the case of performing rotation and resolution conversion on image data in the RAM 202, for example, these processes can be executed without involving the RAM 202.

Figure 3:
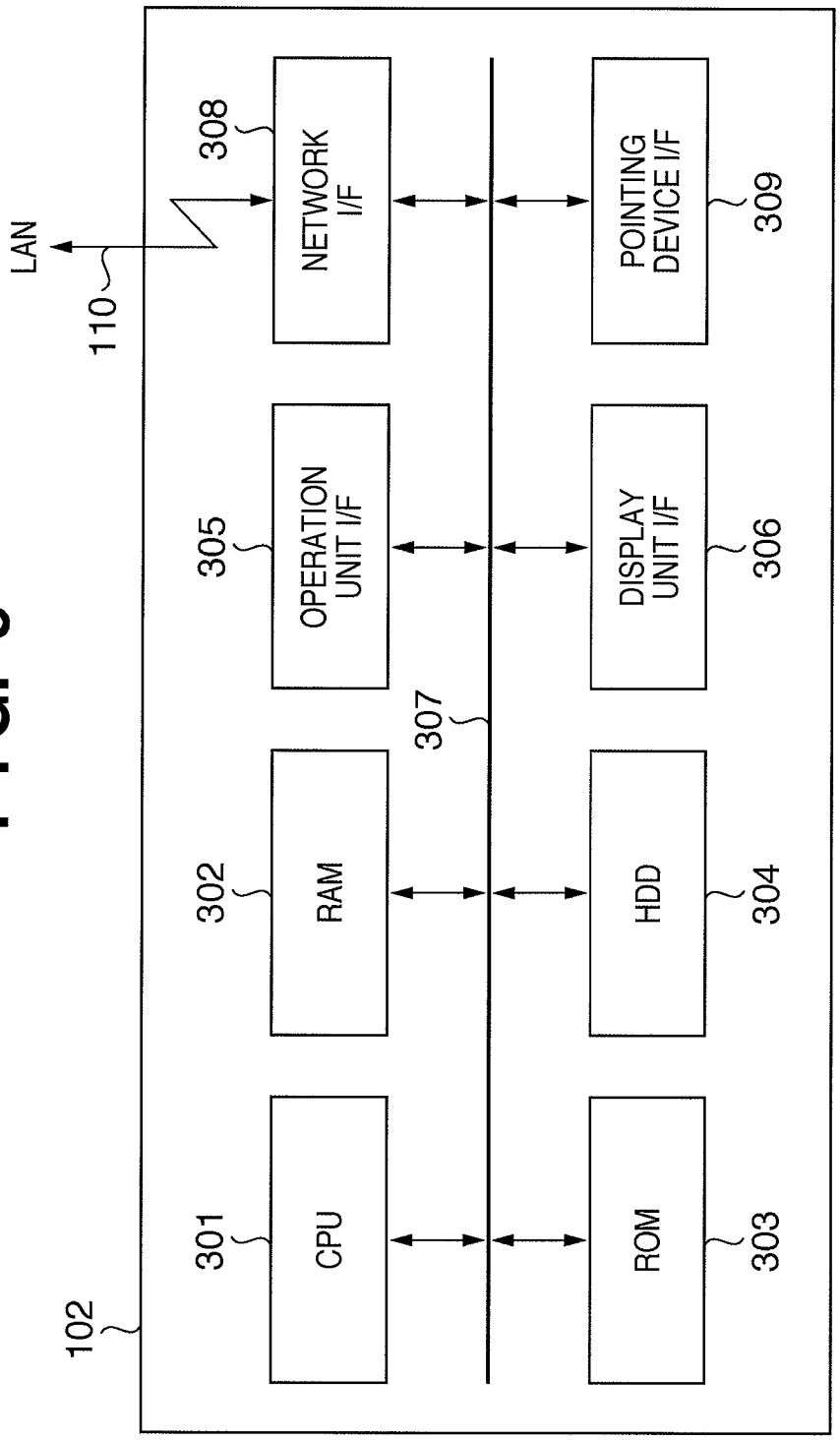
FIG. 3 is a block diagram showing a hardware configuration of a client PC according to the preferred embodiments.

FIG. 3 is a block diagram showing a hardware configuration of the client PC 102 according to the present embodiment.

A CPU 301, a RAM 302, a ROM 303, and a hard disk drive (HDD) 304 are disposed on a system bus 307. Further, an operation unit I/F 305 connected to a keyboard or the like, a display unit I/F 306 connected to a display unit such as a CRT or an LCD, a network I/F 308, and a pointing device I/F 309 connected to a mouse or the like are also connected to the system bus 307. A control program is stored in the ROM 303 or the HDD 304. The CPU 301 reads out the control program from the ROM 303 or the HDD 304 to the RAM 302 as necessary, and executes the read program. The CPU 301 also controls display of a variety of information on a display unit (not shown) via the display unit I/F 306, and receives user instructions or the like via the operation unit I/F 305 or the pointing device I/F 309. Further, the CPU 301 communicates via the network I/F 308 with apparatuses connected to the LAN 110. The server 103 is provided with a similar hardware configuration to the client PC 102.

Figure 4:
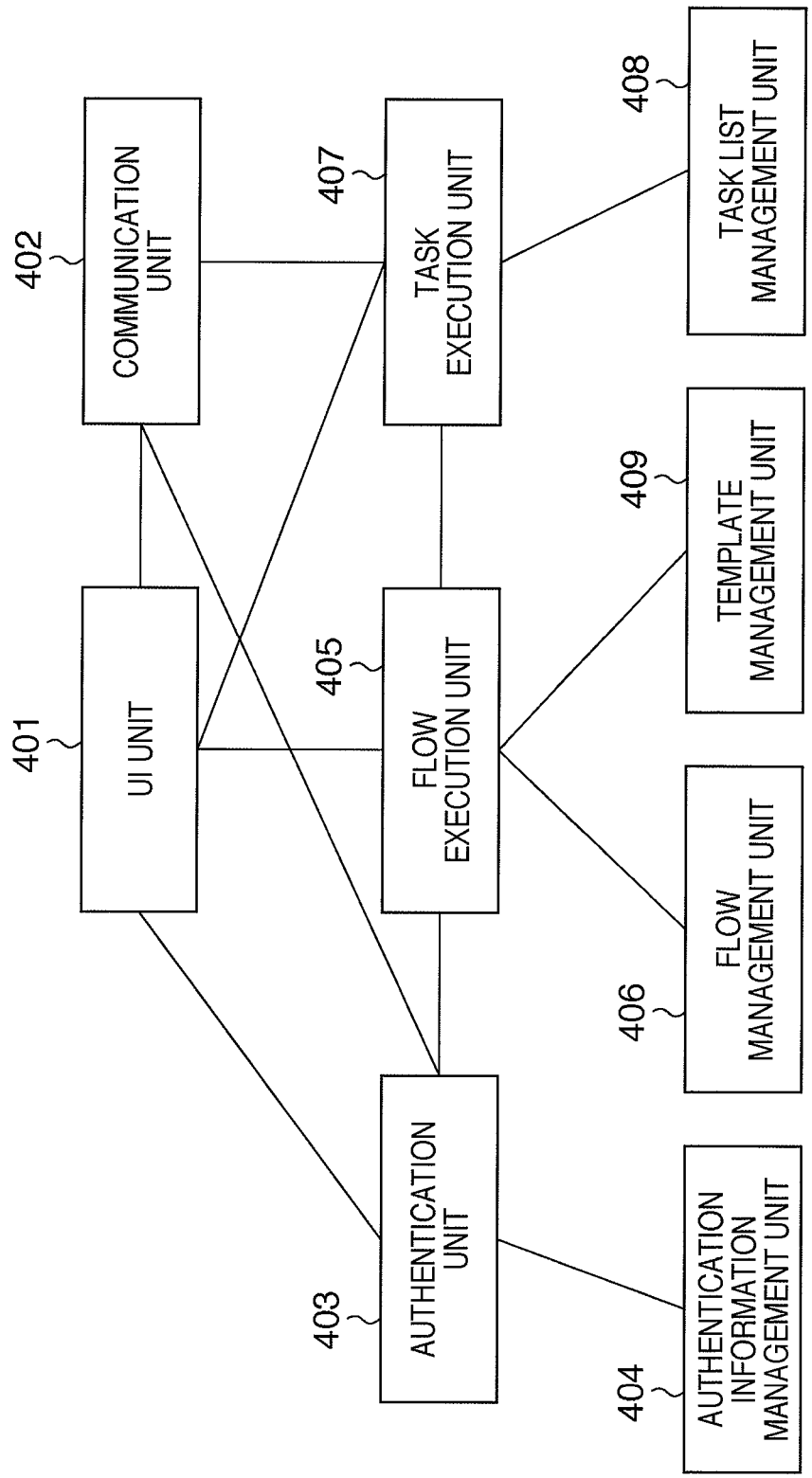
FIG. 4 shows combinations of the functions of the image forming apparatus according to the preferred embodiments, and a configuration of software modules of the MFP that relate to controlling the flow of the process order.

FIG. 4 shows combinations of the functions (hereinafter, tasks) of the MFP 101 according to the present embodiment, and a configuration of software modules of the MFP that relate to controlling the flow of the process order (hereinafter, process flow). Note that these software modules are saved on the HDD 204, developed in the RAM 202 at the time of execution, and executed under the control of the CPU 201.

A UI unit 401 is a software module that performs display on the operation unit 212 via the operation unit I/F 206, and processes user input from the operation unit 212. A communication unit 402 is a software module that operates the network I/F 210 or the modem 213 to perform communication. An authentication unit 403 is a software module that performs user authentication on receipt of login information on a user who has operated the UI unit 401 and user information received from the communication unit 402, and manages user sessions. An authentication information management unit 404 is a software module that manages authentication information on users, and responds to inquiries for authentication information from the authentication unit 403. While the MFP 101 holds the authentication information in the present embodiment, a separate authentication server may be provided and the authentication information may be managed by this server. A flow execution unit 405 is a software module that analyzes process flow definition files and process flow template definition files. The flow execution unit 405 also breaks process flows down into task settings in function units (e.g., scan job settings, print job settings, send job settings). A flow management unit 406 is a software module for managing a process flow management file that indicates which process flow execution buttons to display on the operation unit 212 when respective users are logged in. The flow management unit 406 also manages process flow definition files that define the settings for executing process flows. Note that the process flow management file and process flow definition files will be described below. While descriptions of process flows are handled as files in the present embodiment, the descriptions of process flows may be handled as data held in the RAM 202. A task execution unit 407 is a software module for generating tasks based on the setting information for each type of task, and executing generated tasks. A task list management unit 408 is a software module for managing tasks targeted for execution. A template management unit 409 is a software module for managing the process flow template management file. The template management unit 409 also manages process flow template definition files. Note that the process flow template management file and the process flow template definition files will be described below.

Various tasks are generated as a result of requests from the UI unit 401, the communication unit 402, and the flow execution unit 405. If, for example, a copy or scan instruction is received from a user with the UI unit 401, the respective task settings for copying or scanning are passed from the UI unit 401 to the task execution unit 407 and registered in the task list management unit 408. The task execution unit 407 executes the tasks managed by the task list management unit 408 in order. Similar processing is performed in the case where task settings are received from another image forming apparatus or PC via the communication unit 402.

FIG. 5 schematically represents a process flow management file managed by the MFP 101 according to embodiment 1 of the present invention. While a table format is used as the schematic diagram in the present embodiment, a comma separated value (CSV) format or an extensible markup language (XML) text file may be used.

Reference numeral 501 denotes a management ID of the process flow. Reference numeral 502 denotes a name of the process flow. Reference numeral 503 is information showing who has access rights to the process flow. For example, access rights to the process flow with the ID "1" are assigned to User A, and when User A is logged in, this process flow is displayed as a button on the display unit of the operation unit 212. As for process flows with shared access rights, the respective buttons are displayed irrespective of the user that is logged in (the various screens will be described below). Reference numeral 504 denotes a template ID showing which process flow template the process flow was created from. Process flow templates will be described below. Reference numeral 505 represents the last update date and time of the process flow template forming the basis of the process flow. Reference numeral 506 is a definition of the process flow.

FIG. 6 shows an exemplary process flow definition file used by the MFP 101 according to embodiment 1.

In the present embodiment, a process flow definition file 600 is handled as an XML file. The process flow definition file 600 can be created by the client PC 102 or the MFP 101. The tasks included in this process flow are represented as XML tags, and the order of appearance thereof is assumed to match the processing order of the tasks. The advanced settings content related to the tasks has, however, been omitted in FIG. 6. The tag 650 will be described below using FIG. 7.

The tag 601 indicates that a scan task is to be executed using the scanner 270 to input an image. The tag 602 indicates a task for handling image data saved on the HDD 204 as an input document. The tag 603 specifies image data (here "doc101") saved on the HDD 204. The tag 604 indicates that a "Combine" task is to be executed to convert a plurality of image data into a single piece of image data. The "Combine" task of the tag 604 indicates that image data with ID "doc101" saved on the HDD 204 is to be combined with image data with ID "scan001" obtained by scanning. The tag 605 indicates that a "Send" task is to be executed to transmit image data to a transmission destination. The tag 606 indicates an address that serves as a transmission destination in the send task settings. A plurality of the addresses serving as transmission destinations can be set by adding tags 606. Addresses for email transmission, file transmission such as server message block (SMB) transmission, fax transmission or the like can be set in a "Send" task. The tag 607 indicates that a "Print" task is to be executed to print image data with the printer unit 295.

In other words, the process flow shown in FIG. 6 involves combining image data scanned by the scanner 270 with image data saved on the HDD 204, and transmitting and printing the combined image data.

FIG. 7 illustrates the tag 650 shown in FIG. 6.

Reference numeral 651 represents a management ID of the process flow. Reference numeral 652 represents a name of the process flow. Reference numeral 653 represents a management ID showing the template forming the basis of the process flow. Reference numeral 654 denotes a name of the template forming the basis of the process flow. Reference numeral 655 denotes the last update date and time of the template forming the basis of the process flow.

In other words, according to the tag 650 shown in FIG. 6, the management ID and name of the process flow in FIG. 6 are respectively "1" and "Combine & Send Contractual Document". Further, this tag shows that the process flow is based on a template that was last updated on "20XX/ . . . ", and whose management ID is "101" and name is "Send Contractual Document".

FIG. 8 schematically represents a process flow template management file managed by the MFP 101 according to embodiment 1.

While a table format is used as the schematic diagram in the present embodiment, a comma separated value (CSV) format or an extensible markup language (XML) text file may be used. Reference numeral 801 denotes a management ID of the process flow template. Reference numeral 802 denotes a name of the process flow template. Reference numeral 803 denotes the last update date and time of the process flow template. Reference numeral 804 denotes the date and time at which the process flow template was created. Reference numeral 805 denotes a definition file of the process flow template. Process flow template definition files will be described below using FIG. 9.

FIG. 9 shows an exemplary process flow template definition file according to embodiment 1.

These process flow template definition files can only be created by the administrator using the MFP 101 or the client PC 102 having the process flow templates. Process flow template definition files created with the client PC 102 are sent to and managed by the server 103. Then, by being distributed from the server 103 to MFPs including the MFP 101, the process flow template definition files are saved in the MFPs.

The tag 901 indicates that this definition file is a process flow template, with the attributes thereof being management ID, name, created date and time, and last update date and time of the process flow template. The tag 902 indicates that this task is based on a template due to <TempTask>, and is not editable by a user. The attributes of this tag are task name ("Scan" in the case of tag 902) and an attribute 903 that indicates the executability of the task. The attribute 903 indicates whether the task is to be executed when the process flow is executed. When the value of the attribute 903 is set to execute the task, advanced settings will be included as subelements of the tag 902, similarly to the process flow definition file. A plurality of tasks that general users are not allowed to edit can be set by adding tags the same as the tag 902. Note that tasks in a process flow template other than those represented by tags the same as the tag 902 can be edited by general users.

In other words, the process flow template definition file in FIG. 9 will result in documents on the HDD 204 and scanned images being respectively printed and transmitted when the process flow is executed. The template definition file in FIG. 9 indicates that in the case where a user creates a process flow from this process flow template, the user will unable to edit (i.e., add, delete, etc.) the settings of the "Scan", "Box", "Save", "Print" or "Send" tasks.

While the editability of a task for users is represented in the present embodiment by whether or not the tag 902 exists, editability may, of course, be represented by a tag attribute or by a subelement.

Also, while editability is defined for each task in the present embodiment, editability may, of course, be defined on a larger scale such as for input tasks, editing tasks and output tasks, or on a smaller scale such as for the advanced settings of a task.

FIG. 10 shows an exemplary operation screen displayed on the operation unit 212 when a user A has logged in.

The button 1001 is for displaying the screen of an application for executing process flows (hereinafter, process flow application). In the present embodiment, it is assumed that buttons for displaying other applications are not displayed. FIG. 10 shows a state in which the screen of the process flow application is displayed.

The buttons 1002 and 1003 are buttons displayed on the process flow application screen for calling and executing process flows. The Access column 503 of the process flow management file shown in FIG. 5 will indicate "User A" for the process flows displayed as buttons when User A is currently logged in. On the other hand, the Access column 503 will indicate "User B" for the process flows displayed as buttons when User B is logged in, similarly to the case of User A. The Share button 1004 is for switching display to a shared screen, irrespective of the user logged in. In FIG. 10, a list of process flows ("Combine & Send Contractual Document", "Distribute Minutes") with respect to which the column 503 in FIG. 5 indicates "User A" are displayed as the buttons 1002 and 1003, and the names and a description (process flow definition information) of these process flows are displayed.

FIG. 11 shows an exemplary "shared screen" that includes list display of process flow templates and display of a process flow with respect to which access is shared, when a Share button 1004 in FIG. 10 has been pressed.

The buttons 1101 and 1102 are for selecting the process flow templates that are displayed. Here, the process flow templates presented to the user are managed with the process flow template management file shown in FIG. 8. The button 1103 indicates the "Business Trip Application" process flow with respect to which access is shared. This process flow can be executed by pressing any of buttons 1101 to 1103. The button 1104 is for switching display to a screen for creating a process flow from the selected process flow template. Note that it is possible to return to the screen shown in FIG. 10 by pressing the Back button 1105 in the state shown in FIG. 11.

Figure 12:
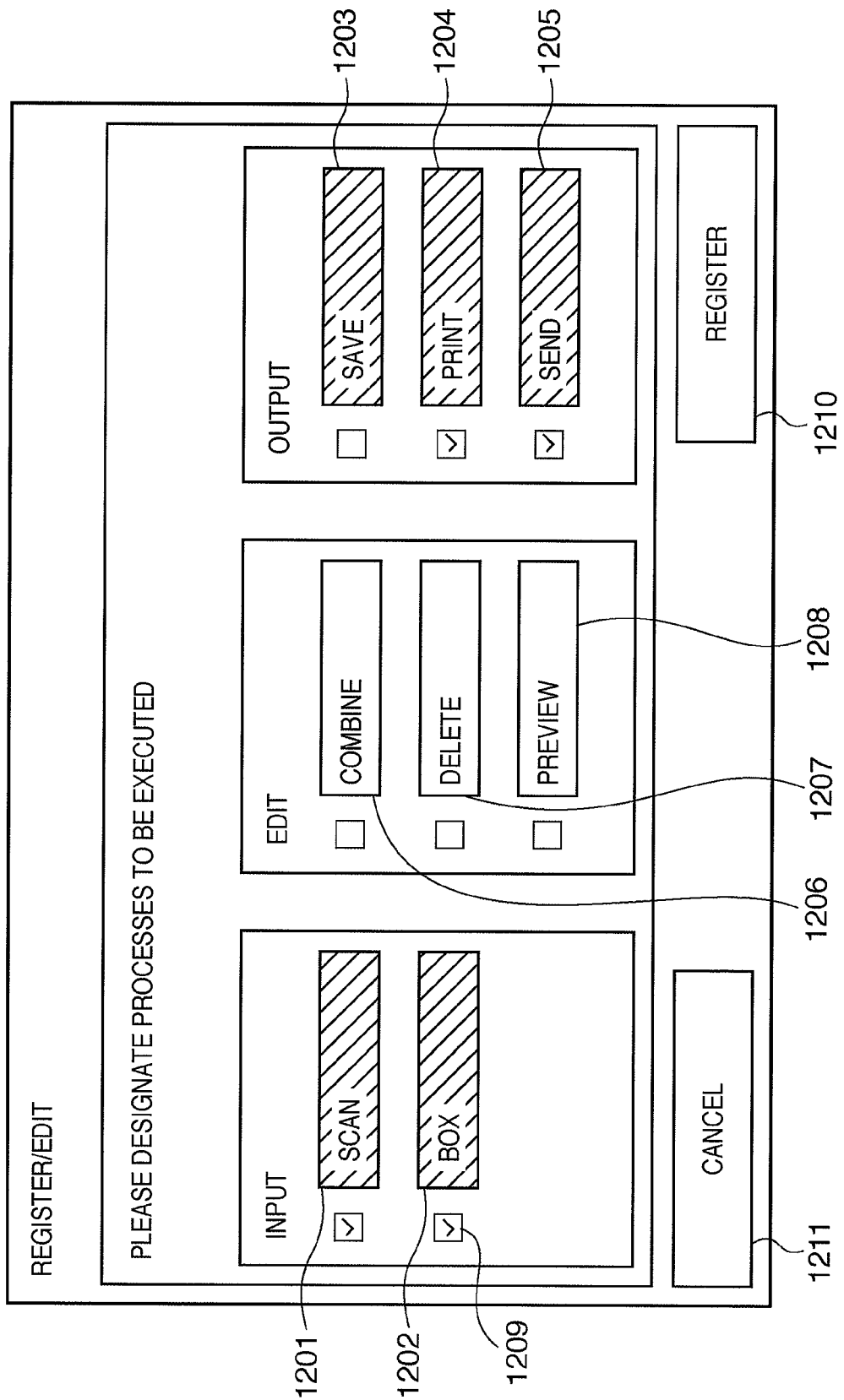
FIG. 12 shows an exemplary process flow creation screen according to the preferred embodiments.

FIG. 12 shows an exemplary process flow creation screen according to the present embodiment.

The screen displayed here is the process flow creation screen displayed when the process flow template "Send Contractual Document" 1101 shown in FIG. 11 is selected and the "Create Button" button 1104 is designated.

The buttons 1201 to 1208 (hereinafter, task setting buttons) represent, in order, the tasks "Scan", "Box", "Save", "Print", "Send", "Combine", "Delete", and "Preview". Display is switched to an advanced settings screen (not shown) of the respective task as a result of one of these buttons being pressed.

When a task has been set on the advanced settings screen, a checkmark is displayed beside the task setting button, such as shown in the checkbox 1209, for example. Tasks that have a checkmark displayed beside the task setting button will be executed as a process flow. These tasks are registered as a process flow when the Register button 1210 is designated. Process flow creation/editing are cancelled and display returns to the shared screen when the Cancel button 1211 is designated.

The process flow creation screen in FIG. 12 shows an exemplary screen for creating a process flow based on the process flow template "Send Contractual Document". As illustrated in FIG. 9, the process flow template "Send Contractual Document" is set to execute the "Scan", "Box", "Print" and "Send" tasks as a process flow. Note that, here, none of these tasks can be edited. The "Save" task has not been set for execution, and is a non-editable task. The other tasks are editable. Thus, in FIG. 12, the tasks that are not editable, such as the buttons 1201 to 1205, are identifiably displayed by being grayed out (shaded) at the stage at which the screen is opened, and editing of these tasks cannot be instructed. While graying out is used in the present embodiment, non-editable tasks may be hidden or, at any rate, configured so that the user is unable to set these tasks. Checkmarks are displayed beside all of the buttons 1201 to 1205, except for the "Save" button 1203 which has not been set for execution.

Figure 13:
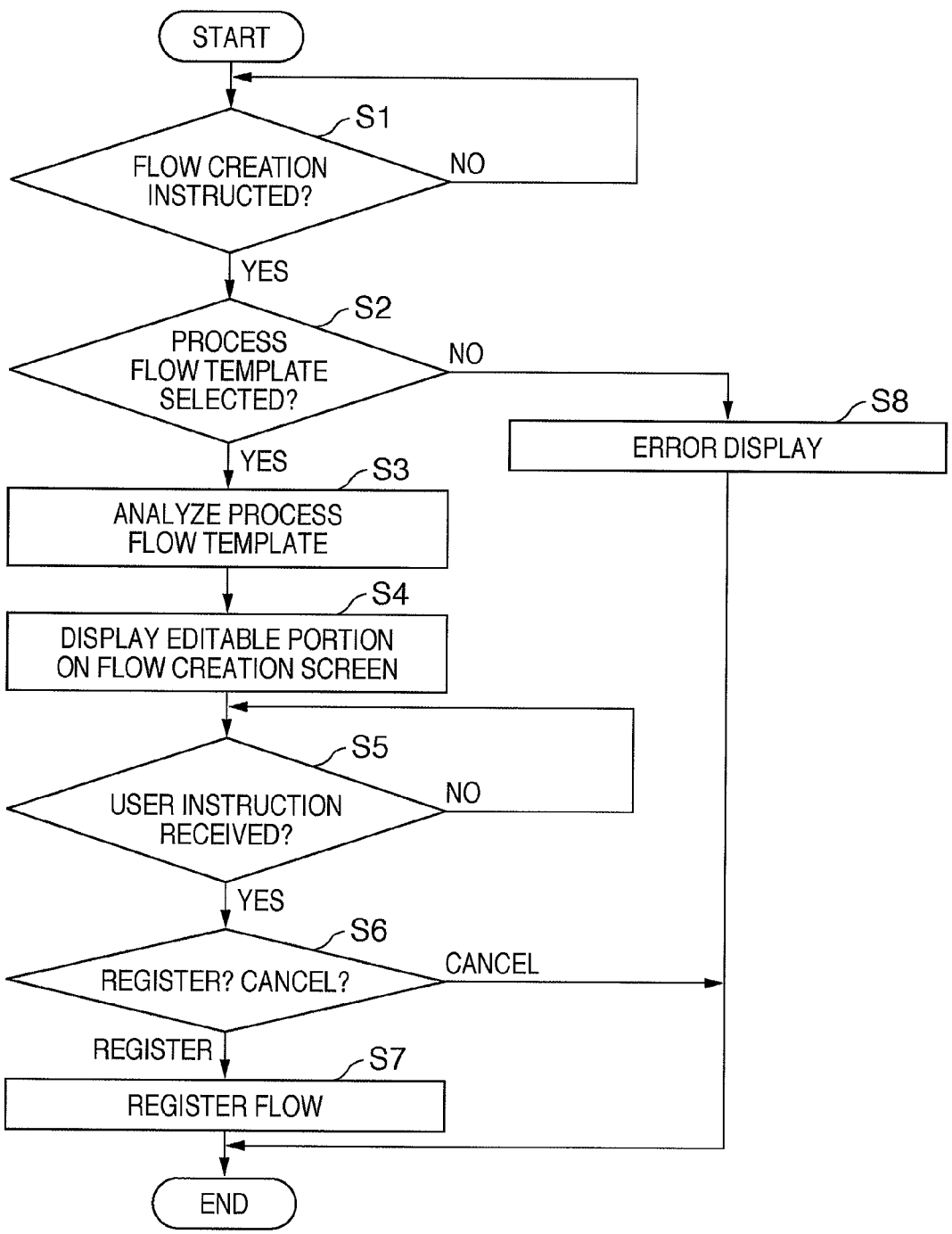
FIG. 13 is a flowchart illustrating a data process procedure of the image forming apparatus up to the point of creating a process flow from a process flow template according to the preferred embodiments.

FIG. 13 is a flowchart illustrating a data process procedure of the MFP 101 up to the point of creating a process flow from a process flow template according to the present embodiment. Here, the user is assumed to already be logged in, having been successfully authenticated. While the authentication method for logging in is not particularly illustrated, a method that involves the user inputting a username and a password as character strings may be used, or user authentication may be performed using an IC card or biometric information. Note that, here, the UI unit 401 displays the shared screen shown in FIG. 11. Note also that the program that executes this processing is stored in the RAM 202 at the time of execution, and is executed under the control of the CPU 201.

Firstly, at step S1, the UI unit 401 monitors whether a flow creation instruction has been received from the user. If an instruction has been received, the processing proceeds to step S2, and if not, the UI unit 401 continues monitoring at step S1. At step S2, the flow execution unit 405 determines from the management ID of the button designated by the user whether a process flow template has been selected. If a process flow template has been selected, the processing proceeds to step S3.

At step S3, the flow execution unit 405 acquires the template definition file of the process flow template designated by the user from the template management unit 409, and analyzes the acquired template definition file. Next, the processing proceeds to step S4, where the UI unit 401 receives the result of the analysis by the flow execution unit 405, and displays the flow creation screen (FIG. 12) with the non-editable tasks grayed out, after which the processing proceeds to step S5. At step S5, the UI unit 401 performs monitoring until a flow registration or cancel instruction is received from the user. If an instruction has been received, the processing proceeds to step S6, and if not, the UI unit 401 continues monitoring at step S5. At step S6, the UI unit 401 determines whether the instruction from the user is flow registration or cancellation. If the instruction is flow registration, the processing proceeds to step S7, and if it is cancellation, the processing is ended without registering the process flow. At step S7, the flow execution unit 405, having received an instruction from the UI unit 401, registers the process flow in the flow management unit 406, after which the processing is ended.

If, at step S2, a process flow template has not been selected, the processing proceeds to step S8, and the UI unit 401 notifies the user that process flow creation cannot be performed, after which the processing is ended.

Figure 14:
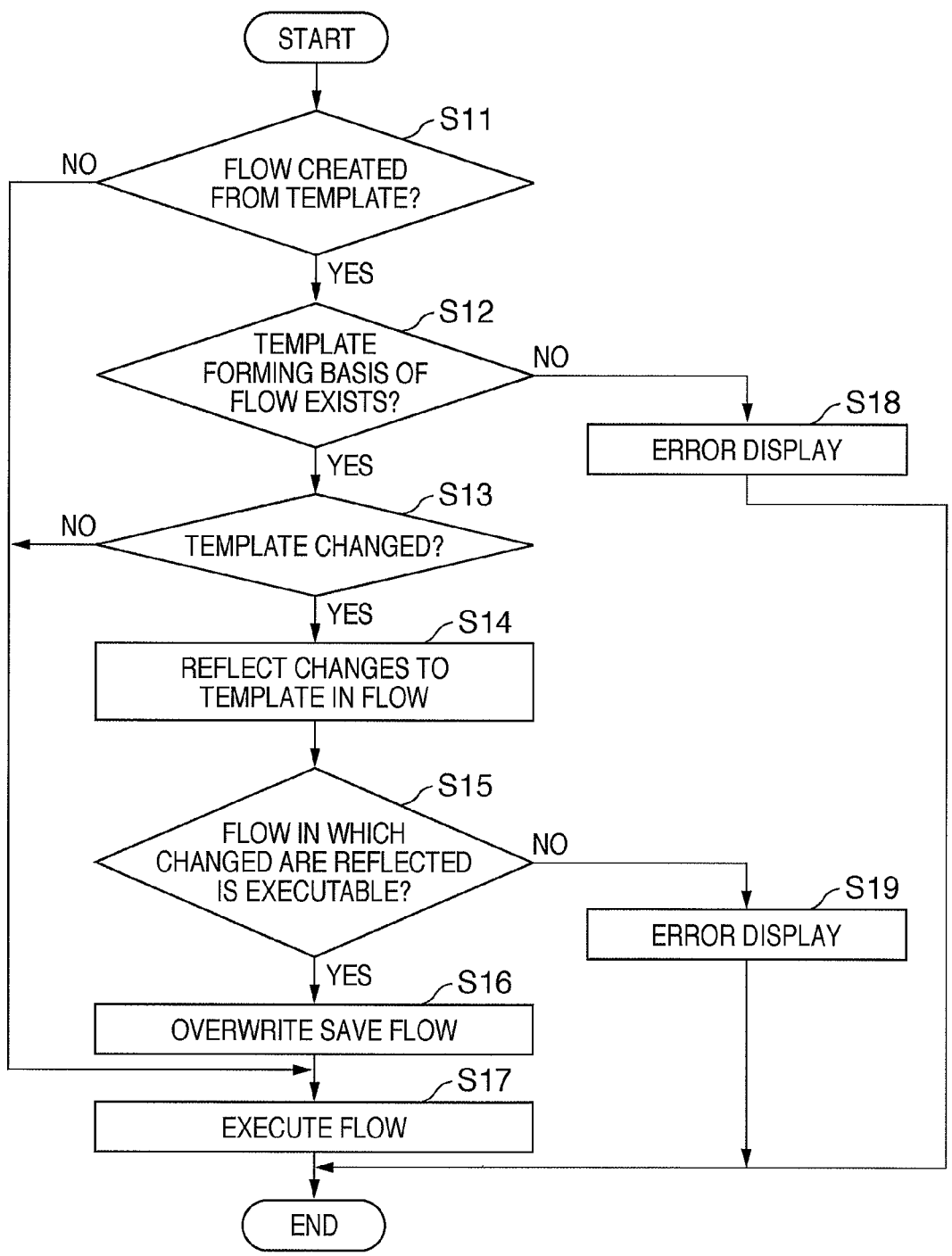
FIG. 14 is a flowchart illustrating a data process procedure of the image forming apparatus from the point at which a user presses a button to initiate process flow execution up to the point at which the process flow is executed in the preferred embodiments.

FIG. 14 is a flowchart illustrating a data process procedure of the MFP 101 from the point at which a user presses a button to instruct process flow execution up to the point at which the process flow is executed in the present embodiment. Note that the program that executes this processing is stored in the RAM 202 at the time of execution, and is executed under the control of the CPU 201.

At step S11, the flow management unit 406, having received an instruction from the flow execution unit 405, determines whether the process flow was created from a process flow template. At this time, the flow execution unit 405 checks with the flow management unit 406. The flow management unit 406 determines from the process flow management file whether the process flow was created from a process flow template, and feeds the result back to the flow execution unit 405. Here, if the process flow was created from a process flow template, the processing proceeds to step S12. On the other hand, if the process flow was not created from a process flow template, the processing proceeds to step S17.

At step S12, the template management unit 409, having received an instruction from the flow execution unit 405, determines whether the process flow template forming the basis of the process flow exists in the template management file. If the process flow template exists in a template management file, the processing proceeds to step S13, and if not, the processing proceeds to step S18.

At step S13, the flow execution unit 405 determines whether the process flow template forming the basis of the process flow has changed from the when the process flow was created. If the process flow template has changed, the processing proceeds to step S14, and if not, the processing proceeds to step S17. Here, the determination as to whether the process flow template has changed is performed by comparing the "Template Updated On" column 505 of the process flow management file with the "Template Updated On" column 803 of the process flow template management file. While this determination is based on the update date and time in the present embodiment, the process flow definition file may, of course, be actually compared with the process flow template definition file, and the determination performed based on differences in the tasks set as non-editable and differences in the advanced settings.

At step S14, the flow execution unit 405 changes a portion corresponding to the template of the process flow into the changed process flow template, after which the processing proceeds to step S15. At this time, the flow execution unit 405 acquires the changed process flow template definition file from the template management unit 409, and merges this process flow template with the process flow for which the execution instruction was received from the user. When merging, the settings of the process flow template are prioritized. Description of this merging process will be given below using the conceptual diagrams shown in FIG. 15.

At step S15, the flow execution unit 405 analyzes whether the merged process flow is executable. If it is executable, the processing proceeds to step S16, and if it is not, the processing shifts to step S19. At step S16, the flow management unit 406 overwrites the merged process flow. The processing then proceeds to step S17, where the flow execution unit 405 executes the merged process flow, and the processing is ended. At this step S17, the flow execution unit 405 analyzes the process flow and breaks the process flow down into task settings, which are then passed to the task execution unit 407.

The task execution unit 407 generates tasks from the task settings received from the flow execution unit 405, and executes the generated tasks.

If the process flow was not created from a process flow template, the UI unit 401, at step S18, notifies the user that the process flow cannot be executed since a process flow template forming the basis of the process flow does not exist, and the processing is ended.

At step S19, the UI unit 401 notifies the user that the process flow template forming the basis of the process flow has been edited, and that the process flow cannot be executed even if merged, after which the processing is ended.

Note that while an error is displayed and the processing is ended in the present embodiment if the process flow cannot be executed even if merged, the user may be allowed to select whether to execute the changed process flow template as is or whether to end the processing. Alternatively, a process flow creation screen for creating a process flow based on the changed process flow template may be displayed. In this case, a process flow creation screen in which only executable settings are selectable may be displayed, so that the user will know which are the executable settings even if the process flow is merged with the changed template.

Figure 15:
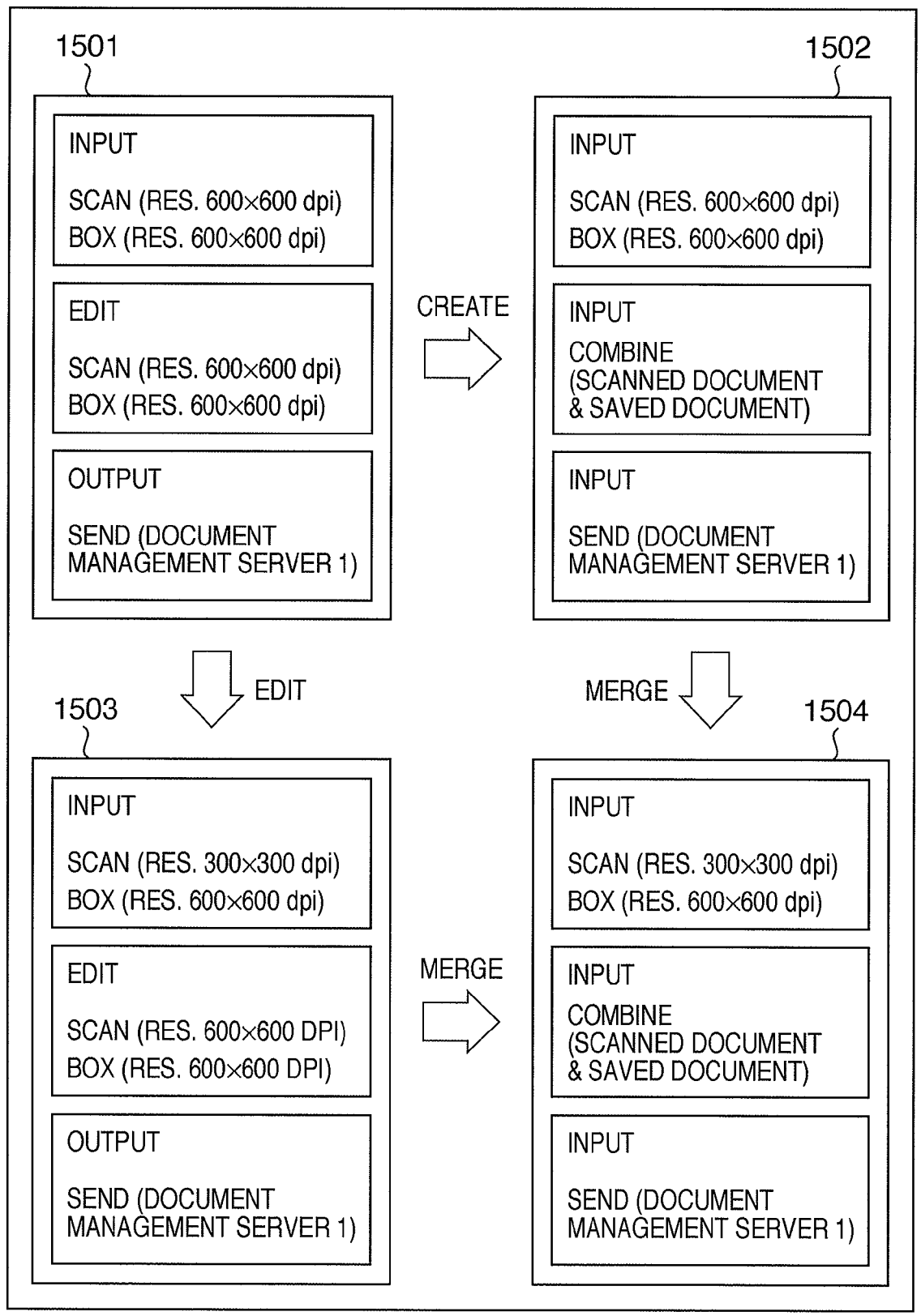
FIG. 15 is a conceptual view illustrating the processing of step S14 by the image forming apparatus according to the preferred embodiments.

FIG. 15 is a conceptual view illustrating the foregoing processing of step S14 by the image forming apparatus according to the present embodiment. Here, the case is shown where, when a template of a process flow has been changed, the template that has been changed is merged with the process flow.

The process flow template 1501 is set so as to execute the "Scan", "Box" and "Send" tasks, which are non-editable. The "Save" and "Print" tasks have not been set for execution, and are non-editable. The remaining "Delete", "Combine" and "Preview" tasks can be edited.

The process flow 1502 was created by the user adding the "Combine" task for combining scanned image data with image data on the HDD 204, based on the process flow template 1501. The process flow template 1503 was obtained as a result of the administrator editing the process flow template 1501 after the user had created the process flow 1502. Here, the scan resolution has been changed from 600×600 dpi to 300×300 dpi. At this time, the process flow template 1503 is written over the process flow template 1501 and saved, with the update date and time and the template definition file being changed, while the template ID and the created date and time remain unchanged. When the process flow 1502 is executed after the process flow template 1501 has thus been edited, merging is performed due to the difference in update dates and times (step S14).

The process flow 1504 results from the process flow 1502 and the process flow template 1503 being merged. The scan resolution is thereby changed from 600×600 dpi with the process flow 1502 to 300×300 dpi with the process flow 1504. If, for example, a restriction stating that combined image data must be the same resolution applies, this process flow would be unexecutable. Determining whether a process flow thus merged can be executed is performed at step S15.

According to embodiment 1 as described above, general users are only able to create and register a process flow based on a process flow template. Further, if a process flow template forming the basis of a process flow has been edited, this change is reflected in the process flow when executed. Not only are general users thereby able to create process flow registration buttons, but they can be allowed to use process flows designed by the administrator. Therefore, the burden on the administrator can be reduced.

Embodiment 2

In the foregoing embodiment 1, the MFP 101 checks whether the process flow template forming the basis of a process flow had been edited, when the process flow is executed, and merged the edited process flow template with the process flow if edited. In contrast, in embodiment 2, an example is shown in which an edited process flow template is merged with the process flow when overwrite-saved in the MFP 101.

The configuration diagram of embodiment 2 and the hardware and software configurations of the MFP 101, the client PC 102 and the server 103 are similar to embodiment 1. The software operation performed when a template is edited and saved differs. An executability column representing the executability of the process flow is added to the columns of the process flow management file illustrated in FIG. 5 by leaving the column blank if the process flow is executable and inserting "false" if not executable (not shown).

Figure 16:
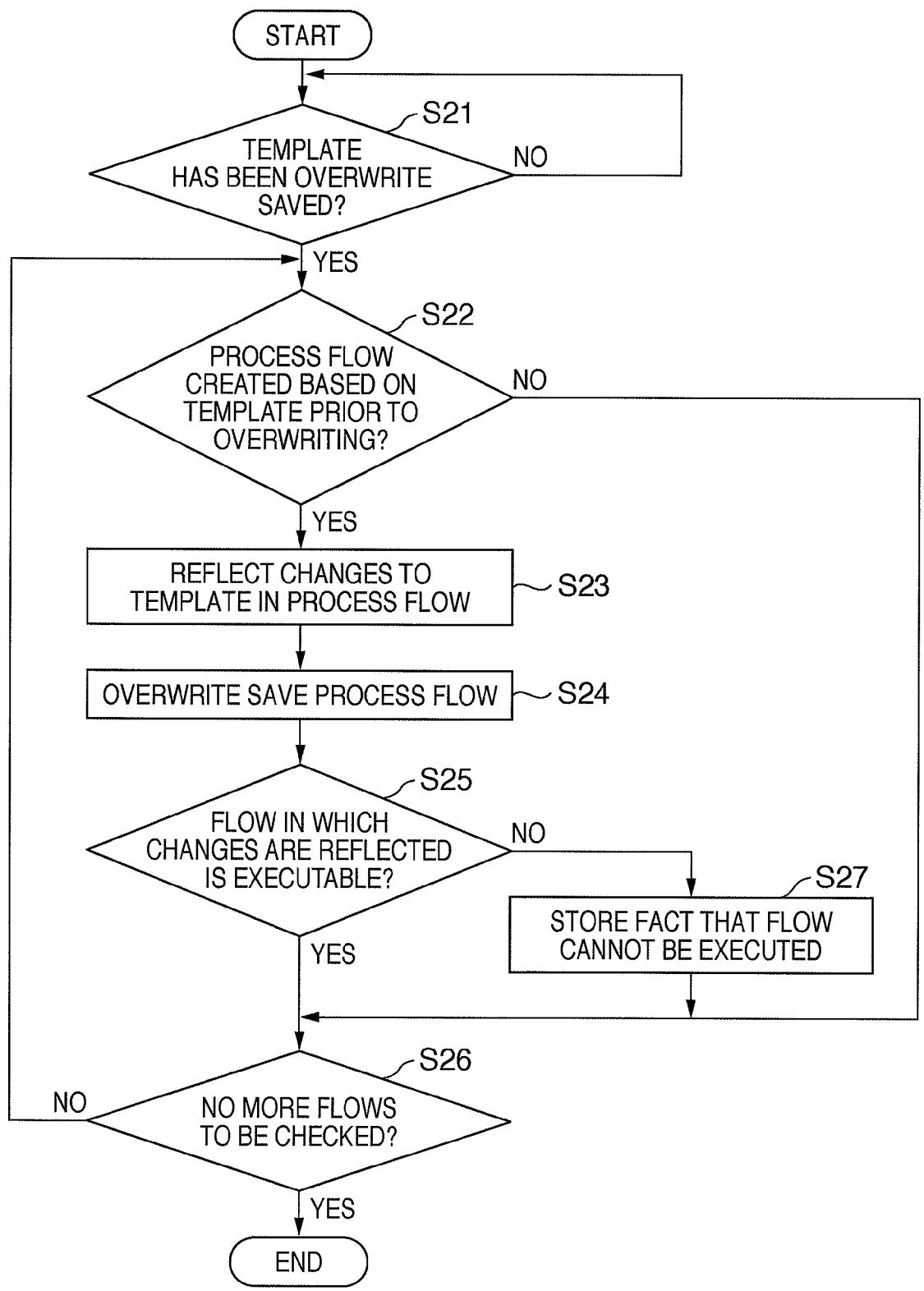
FIG. 16 is a flowchart illustrating a data process procedure from the point at which a process flow template is edited and saved up to the point at which the process flow is merged, in an MFP according to a second embodiment of the present invention.

FIG. 16 is a flowchart illustrating a data process procedure from the point at which a process flow template is edited and saved up to the point at which the process flow is merged, in the MFP 101 according to embodiment 2. Note that the program that executes this processing is stored in the RAM 202 at the time of execution, and is executed under the control of the CPU 201.

Firstly, at step S21, the template management unit 409 monitors whether a process flow template has been overwrite-saved. If a process flow template has been overwrite-saved, the template management unit 409 updates the process flow template management file, and notifies the flow execution unit 405 that the template management file has been updated, after which the processing proceeds to step S22. On the other hand, if a process flow template has not been overwrite-saved, the template management unit 409 continues monitoring at step S21. At step S22, the flow execution unit 405 checks with the flow management unit 406 as to whether there is a process flow that was created based on the changed process flow template. At this time, the flow management unit 406 examines whether there is a process flow that has been created based on the changed process flow template, with reference to the flow management file. If a process flow has been created based on the changed process flow template, the processing proceeds to step S23, and if not, the processing proceeds to step S26.

At step S23, the flow execution unit 405 reflects the edited content of the changed process flow template in the process flow, and processing proceeds to step S24. At step S24, the flow management unit 406 overwrite-saves the process flow in which the edited content is reflected. Next, at step S25, the flow execution unit 405 analyzes the process flow in which the edited content is reflected and determines whether this process flow is executable. If it is determined to be executable, the processing proceeds to step S26, and if it is not executable, the processing shifts to step S27. At step S26, the flow execution unit 405 checks with the flow management unit 406 as to whether all of the process flows in the process flow management file have been examined. If all process flows have been examined, the processing is ended, and if all process flows have not been examined, the processing proceeds to step S22.

If, at step S25, the process flow in which the edited content is reflected is not executable, the processing proceeds to step S27, where the flow management unit 406 updates the process flow management file by entering "false" in the executability column.

While not particularly shown here, the button of a process flow with respect to which the executability column in the process flow management file indicates "false" may be changed a color other that that used for executable processes, when the UI unit 401 displays the process flows as buttons. In this case, a comment or the like indicating that the process flow is not executable may be displayed in proximity to the button, for example, rather than displaying the button in a different color. In any case, display must be performed so that the user is aware that the process flow cannot be executed.

According to embodiment 2 as described above, changed content can be reflected in all process flows created based on a process flow template when that template has been edited. Further, if a process flow is rendered unexecutable as a result of the changed content being reflected therein, display of the corresponding button can be changed. The user is thereby able to perceive changes in the process flow template prior to the process flow being executed. The user can also be aware of the fact that a process flow has been rendered unexecutable due to changes to the template.

Other Embodiments

Note that the present invention can be achieved by a software program that realizes the functions of the foregoing embodiments being directly or remotely supplied to a system or an apparatus, and by a computer in the system or apparatus reading out and executing the supplied program. In this case, the mode need not be a program as long as the functions of a program are provided.

Consequently, the present invention is also realized by the actual program code installed on the computer, in order to realize the functions and processes of the present invention by computer. In other words, the claims of the present invention also encompass the actual computer program for realizing the functions and processes of the present invention. In this case, the program may in any form, such as object code, a program executed by an interpreter or script data supplied to an operating system, as long as the functions of a program are provided.

Various recording media can be used for supplying the program. These include floppy® disk, hard disk, optical disk, magneto-optical disk, MO, CD-ROM, CD-R, CD-RW, magnetic tape, nonvolatile memory card, ROM, and DVD (DVD-ROM, DVD-R).

Otherwise, the program can be supplied by connecting to a website on the Internet using the browser of a client computer, and downloading the program from the website to a recording medium such as a hard disk. In this case, the actual computer program of the present invention or a compressed file including an auto-install function may be downloaded. Supply can also be realized by dividing the program code constituting the program of the present invention into a plurality of files and downloading the respective files from different websites. In other words, a World Wide Web (WWW) server that allows a plurality of users to download program files for realizing the functions and processes of the present invention by computer is also encompassed by the claims of the present invention.

The program of the present invention may be distributed to users in encrypted form stored on a storage medium such as a CD-ROM. In this case, users that meet a prescribed requirement are allowed to download decryption key information from a website via the Internet, and the encrypted program is installed on a computer in executable form using this key information.

The functions of the foregoing embodiments can be realized in forms other than those described above, as a result of a computer executing the read program. For example, an operating system or the like running on a computer can perform part or all of the actual processing based on instructions in the program, with the functions of the foregoing embodiments being realized as a result of this processing.

Further, the program read out from the storage medium may also be written to a memory provided in a function expansion board inserted in a computer or a function expansion unit connected to a computer. In this case, a CPU or the like provided in the function expansion board or the function expansion unit subsequently performs part or all of the actual processing based on instructions in the program, with the functions of the foregoing embodiments being realized as a result of this processing.

The present invention enables edited content to be reflected in a process flow when the process flow has been created based on a template and the template forming the basis of the process flow has been edited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-001646, filed on Jan. 8, 2008, which is hereby incorporated by reference herein in its entirety.

What is claimed is:

1. An information processing apparatus comprising:
    a creation unit configured to create a process flow that describes process content of a task, based on a process flow template;
    an execution unit configured to execute a process in accordance with content of the process flow created by the creation unit;
    an editing unit configured to edit the process flow template; and
    a changing unit configured to change, in a case where the process flow template used for creating the process flow by the creation unit is edited by the editing unit after creating the process flow, the content of the process flow by editing the created process flow with content resulting from the editing unit editing the process flow template.

2. The information processing apparatus according to claim 1, further comprising:
    a storage unit configured to store the process flow created by the creation unit; and
    a list display unit configured to list-display the process flow stored in the storage unit,
    wherein the editing unit selects a template forming a basis of the process flow displayed on the list display unit and edits the selected template.

3. The information processing apparatus according to claim 1, wherein if a template forming a basis of a process flow targeted for execution is edited by the editing unit, the execution unit executes the process flow targeted for execution after the process flow targeted for execution has been changed by the changing unit.

4. The information processing apparatus according to claim 1, wherein if a template forming a basis of a process flow targeted for execution is edited by the editing unit, the execution unit determines, after the process flow targeted for execution has been changed by the changing unit, whether the process flow is executable.

5. The information processing apparatus according to claim 1, further comprising a notification unit configured to notify that the process flow is not executable, if it is determined by the execution unit that the process flow is not executable.

6. The information processing apparatus according to claim 1, wherein the editing unit comprises a display control unit configured to identifiably display a template in which an editable region is uneditable, and edits a template selected from editable templates displayed by the display control unit.

7. A control method of an information processing apparatus, comprising the steps of:
creating a process flow that describes process content of a task, based on a process flow template;
executing a process in accordance with content of the process flow created in the creation step;
editing the process flow template; and
changing, in a case where the process flow template used for creating the process flow in the creation step is edited in the editing step after creating the process flow, the content of the process flow by editing the created process flow with content resulting from the editing step editing the process flow template,
wherein at least one processor performs at least one of the steps of the method.

8. The control method according to claim 7, further comprising the steps of:
storing the process flow created in the creation step; and
list-displaying the process flow stored in the storage step, wherein
in the editing step, a template forming a basis of the process flow displayed in the list display step is selected and edited.

9. The control method according to claim 7, wherein if a template forming a basis of a process flow targeted for execution is edited in the editing step, in the execution step, the process flow targeted for execution is executed after the process flow targeted for execution has been changed in the changing step.

10. The control method according to claim 7, wherein if a template forming a basis of a process flow targeted for execution is edited in the editing step, in the execution step, it is determined, after the process flow targeted for execution has been changed in the changing step, whether the process flow is executable.

11. The control method according to claim 7, further comprising the step of notifying that the process flow is not executable, if it is determined in the execution step that the process flow is not executable.

12. The control method according to claim 7, wherein
the editing step includes the step of identifiably displaying a template in which an editable region is uneditable, and
in the editing step, a template selected from editable templates displayed in the display control step is edited.

* * * * *